(12) United States Patent
Subat (10) Patent No.: US 11,336,976 B2
(45) Date of Patent: May 17, 2022

(54) HEADRESTS

(71) Applicant: Bose Corporation, Framingham, MA (US)

(72) Inventor: Bradford Kyle Subat, Northborough, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/433,719

(22) Filed: Jun. 6, 2019

(65) Prior Publication Data

US 2019/0379956 A1 Dec. 12, 2019

Related U.S. Application Data

(60) Provisional application No. 62/682,415, filed on Jun. 8, 2018.

(51) Int. Cl.
*H04R 1/10* (2006.01)
*H04R 1/02* (2006.01)
(Continued)

(52) U.S. Cl.
CPC ............ *H04R 1/025* (2013.01); *B29C 44/08* (2013.01); *B60N 2/879* (2018.02); *B60R 11/0217* (2013.01); *H04R 1/023* (2013.01); *H04R 1/345* (2013.01); *B29K 2075/00* (2013.01); *B29K 2105/0014* (2013.01); *B29K 2105/0026* (2013.01); *B29K 2105/046* (2013.01); *B29K 2105/16* (2013.01); *B29L 2031/3023* (2013.01); *B60N 2002/899* (2018.02); *B60R 2011/0017* (2013.01); *B60R 2011/0288* (2013.01); *H04R 2400/11* (2013.01); *H04R 2499/13* (2013.01)

(58) Field of Classification Search
CPC combination set(s) only.
See application file for complete search history.

(56) References Cited

U.S. PATENT DOCUMENTS 6,136,879 A * 10/2000 Nishida .................. C08G 18/10
521/174
7,819,480 B2 * 10/2010 Asbury ................. B29C 69/004
297/391

(Continued)

FOREIGN PATENT DOCUMENTS

EP       2989808 A1    3/2016
JP     2015100026 A    5/2015

(Continued)

OTHER PUBLICATIONS

International Search Report and Written Opinion dated Oct. 9, 2019 for PCT/US2019/035820.

*Primary Examiner* — Duc Nguyen
*Assistant Examiner* — Assad Mohammed
(74) *Attorney, Agent, or Firm* — Bose Corporation (57) ABSTRACT

A vehicle headrest includes an electro-acoustic transducer and an acoustic enclosure that supports the electro-acoustic transducer. A unitary foam member is coupled to the acoustic enclosure. The foam member has regions of contrasting firmness including a first region having a first firmness and a second region having a second firmness that is greater than the first firmness. The second region defines a speaker grille that is configured to overlie the electro-acoustic transducer.

15 Claims, 8 Drawing Sheets

(51) Int. Cl.
  *B60N 2/879* (2018.01)
  *B29C 44/08* (2006.01)
  *B60R 11/02* (2006.01)
  *H04R 1/34* (2006.01)
  *B60N 2/80* (2018.01)
  *B29K 75/00* (2006.01)
  *B29K 105/00* (2006.01)
  *B29K 105/04* (2006.01)
  *B29K 105/16* (2006.01)
  *B29L 31/30* (2006.01)
  *B60R 11/00* (2006.01)

(56) References Cited

U.S. PATENT DOCUMENTS

| | | | |
|---|---|---|---|
| 10,596,941 B2 * | 3/2020 | Kakishima | B29C 44/42 |
| 2004/0021350 A1 * | 2/2004 | House | B60R 11/0217 |
| | | | 297/217.4 |
| 2005/0286735 A1 * | 12/2005 | Ikeuchi | H04R 1/023 |
| | | | 381/391 |
| 2008/0018162 A1 * | 1/2008 | Galbreath | B60N 2/70 |
| | | | 297/452.48 |
| 2010/0072795 A1 * | 3/2010 | Meixner | B60N 2/888 |
| | | | 297/216.12 |
| 2010/0244511 A1 * | 9/2010 | Gomes | B60N 2/4221 |
| | | | 297/216.12 |
| 2013/0101823 A1 * | 4/2013 | Sanderson | B32B 5/18 |
| | | | 428/221 |
| 2014/0203611 A1 * | 7/2014 | Kondrad | B60N 2/0252 |
| | | | 297/354.12 |
| 2014/0355783 A1 * | 12/2014 | Subat | H04R 5/023 |
| | | | 381/86 |
| 2017/0072869 A1 * | 3/2017 | Ito | H04R 5/023 |
| 2017/0334708 A1 * | 11/2017 | Cheon | B60N 2/80 |
| 2018/0035185 A1 * | 2/2018 | Fujita | H04R 1/028 |
| 2018/0118063 A1 | 5/2018 | Oswald et al. | |
| 2018/0297248 A1 * | 10/2018 | Morgan | B29C 44/1271 |

FOREIGN PATENT DOCUMENTS

| | | |
|---|---|---|
| JP | 2015111796 A | 6/2015 |
| JP | 2016043828 A | 4/2016 |
| JP | 2016513599 A | 5/2016 |
| JP | 2017525456 A | 9/2017 |
| WO | 2014158711 A1 | 10/2014 |
| WO | 2014193685 A1 | 12/2014 |
| WO | 2015108860 A1 | 7/2015 |
| WO | 2016089665 A1 | 12/2016 |
| WO | 2017160594 A1 | 9/2017 |

* cited by examiner

HEADRESTS

CROSS-REFERENCE TO RELATED APPLICATIONS

This application is a continuation of U.S. Application No. 62/682,415, filed Jun. 8, 2018, which is incorporated herein by reference in its entirety.

BACKGROUND

This disclosure relates to headrests with integrated loudspeakers.

SUMMARY

All examples and features mentioned below can be combined in any technically possible way.

In one aspect, a vehicle headrest includes an electro-acoustic transducer and an acoustic enclosure that supports the electro-acoustic transducer. A unitary foam member is coupled to the acoustic enclosure. The foam member has regions of contrasting firmness including a first region having a first firmness and a second region having a second firmness that is greater than the first firmness. The second region defines a speaker grille that is configured to overlie the electro-acoustic transducer.

Implementations may include one of the following features, or any combination thereof. In some implementations, the foam member has a first foam density, and the second region has a second foam density that is greater than the first foam density.

In certain implementations, the second foam density is at least twice (2×) the first foam density.

In some examples, the first region has a foam density of about 2 PCF to about 8PCF, and wherein the second region has a foam density of at least about 12 PCF. These values are based on the use of a soft (flexible) foam, if a more rigid foam is utilized for the second regions the foam density for the rigid foam will likely be lower due to the higher hardness.

In certain examples, the first and second regions each have a hardness less than or equal to Shore A 50.

In some cases, the foam member is formed of a closed cell foam

In certain cases, the foam member is formed of polyurethane.

In some implementations, the second region overlies a portion of the first region, such that the portion of the first region is disposed between the second region and the electro-acoustic transducer.

In certain implementations, the electro-acoustic transducer includes a frame for mounting the electro-acoustic transducer to the acoustic enclosure. The foam member defines a recess that is formed in a portion of the first region that underlies the second region. The recess conforms to a shape of the frame. The foam member further defines an opening within the recess that provides a clear path from the electro-acoustic transducer to the grille.

In some examples, the foam member is configured to engage the frame so as to form an acoustic seal therebetween.

In certain examples, the vehicle headrest includes a pad ring coupled to the frame, wherein the recess has a depth that accommodates the pad ring between the frame and the foam member, and wherein the foam member engages the pad ring so as to form an acoustic seal therebetween.

In some cases, the first region further defines at least a portion of an acoustic channel that helps to divert acoustic energy radiated from the electro-acoustic transducer toward a desired direction.

In certain cases, the first and second regions are formed concurrently in a two-shot molding process.

In some implementations, one of the first region and the second region is formed around the other of the first region and the second region in an insert molding process.

In some cases, either or both of the first region and the second region is formed by a pour-in-place molding process.

In certain implementations, the grille has a thickness of 5 mm to 10 mm.

In another aspect, a method includes molding a unitary foam member for a headrest using a foam molding process. The unitary foam member has regions of contrasting firmness including a first region having a first firmness and a second region having a second firmness that is greater than the first firmness. The second region defines a speaker grille. The molding step includes molding a first part in a first foam molding step, and, then, molding a second part directly onto the first part in a second foam molding step. The first part defines one of the first region and the second region. The second part defines the other one of the first region and the second region.

Implementations may include one of the above and/or below features, or any combination thereof.

In some implementations, molding the first part includes combining a polyol, an isocyanate, and water in a first set of proportions, and molding the second part includes combining the polyol, the isocyanate, and water in a second set of proportions that is different from the first set of proportions.

In certain implementations, molding the first part includes combining a polyol, an isocyanate, and water, and molding the second part includes combining the polyol, the isocyanate, water and an additive selected from: a catalyst, a surfactant, a flame retardant, a filler, and combinations thereof.

DETAILED DESCRIPTION

This disclosure is based, at least in part, on the realization that it can be beneficial to provide a vehicle headrest that includes an integrated loudspeaker with a unitary foam cushion member that includes regions of contrasting firmness in order to balance comfort, manufacturability, and acoustic performance.

Figure 1A:
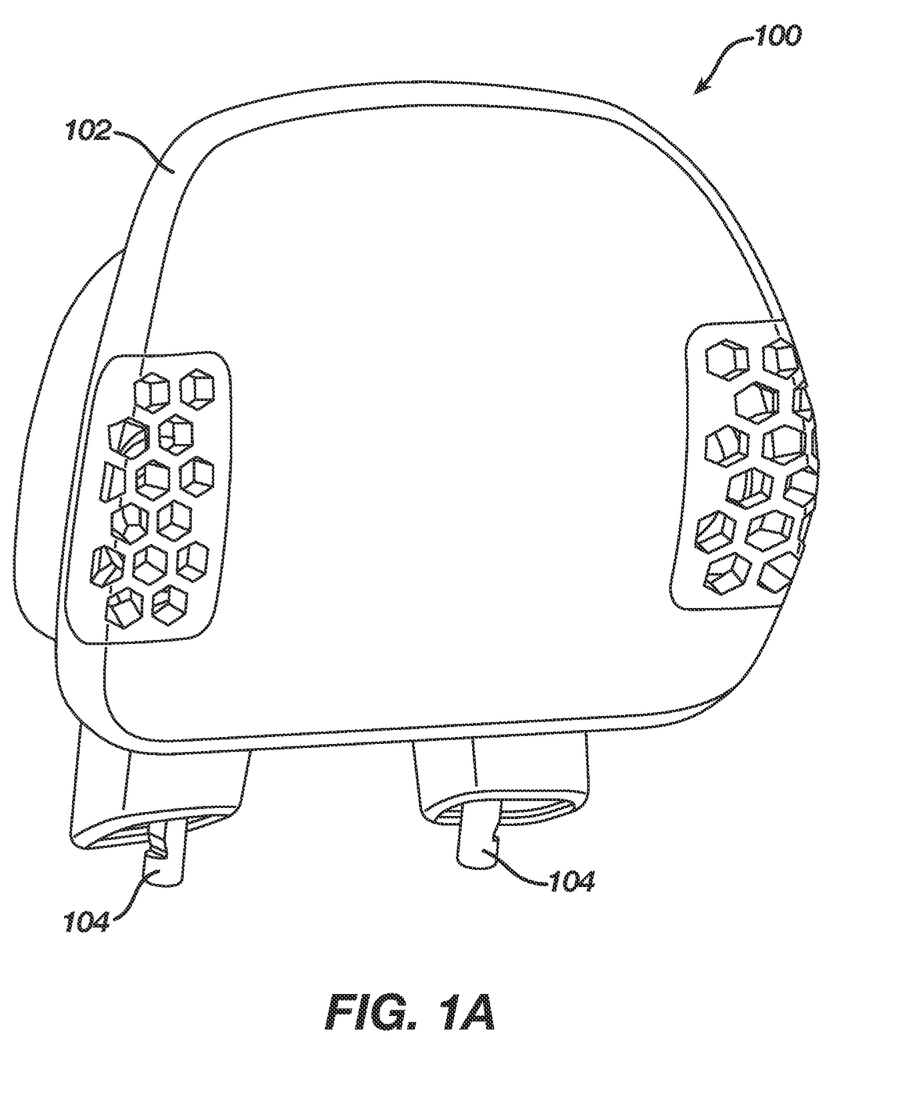
FIG. 1A is front perspective view of a vehicle headrest with an integrated loudspeaker.
Figure 1B:
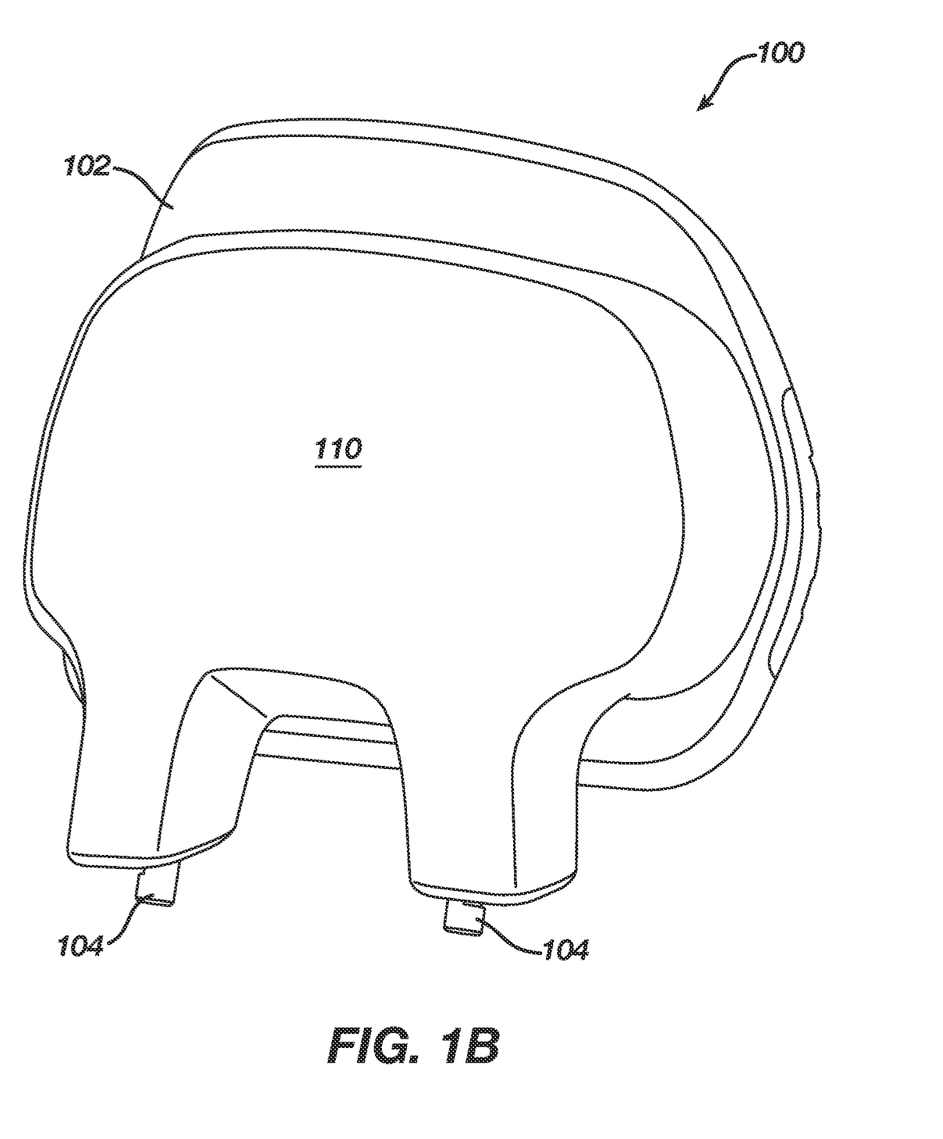
FIG. 1B is a rear perspective view of the vehicle headrest of FIG. 1A.

Referring to FIGS. 1A & 1B, an exemplary vehicle headrest 100 includes a main body portion 102 for supporting the back of a user's head; and one or more (two shown) support rods 104 for detachably mounting the headrest 100 to a seat back.

Figure 2A:
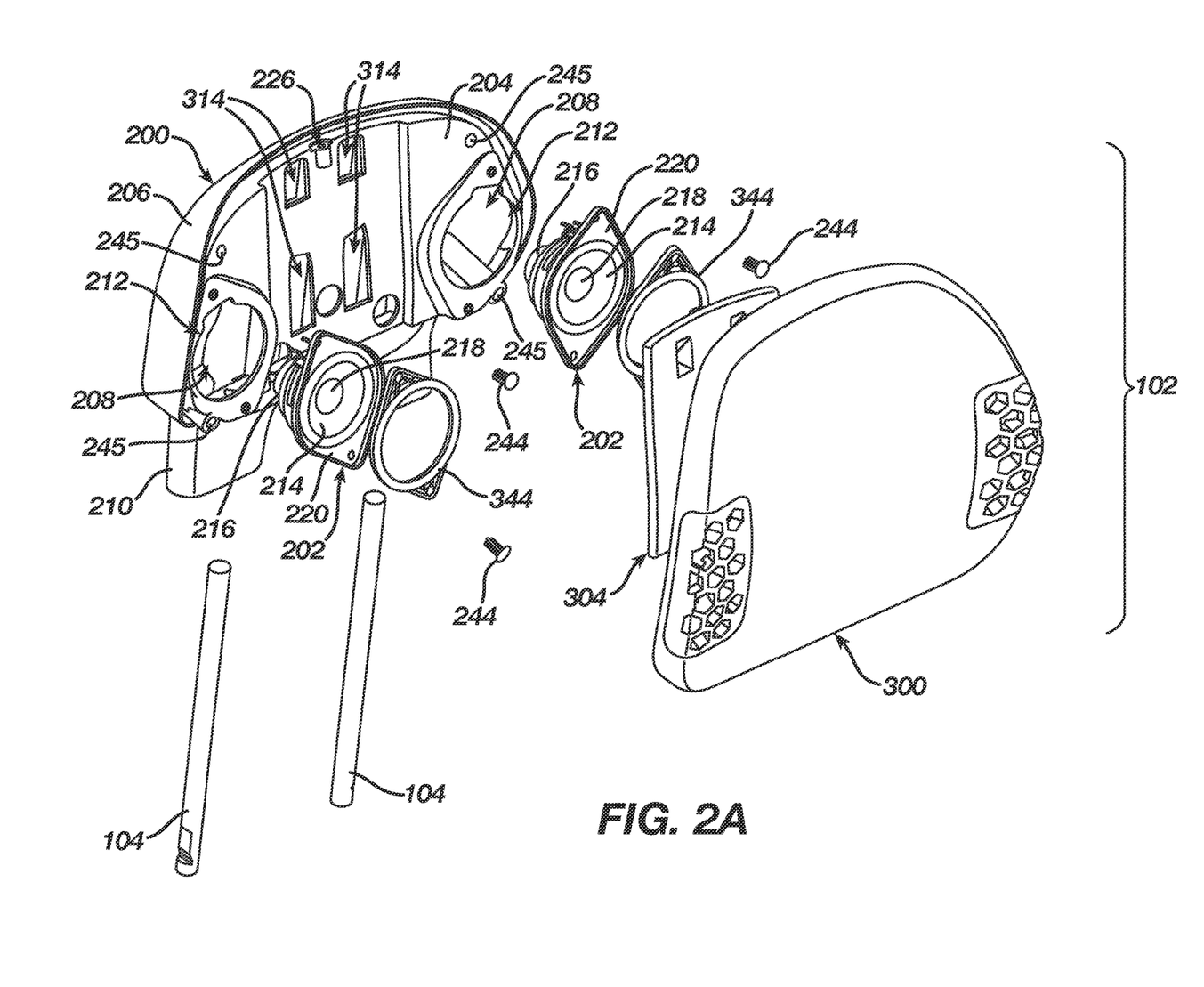
FIG. 2A is an exploded front perspective view of the vehicle headrest of FIG. 1A.
Figure 2B:
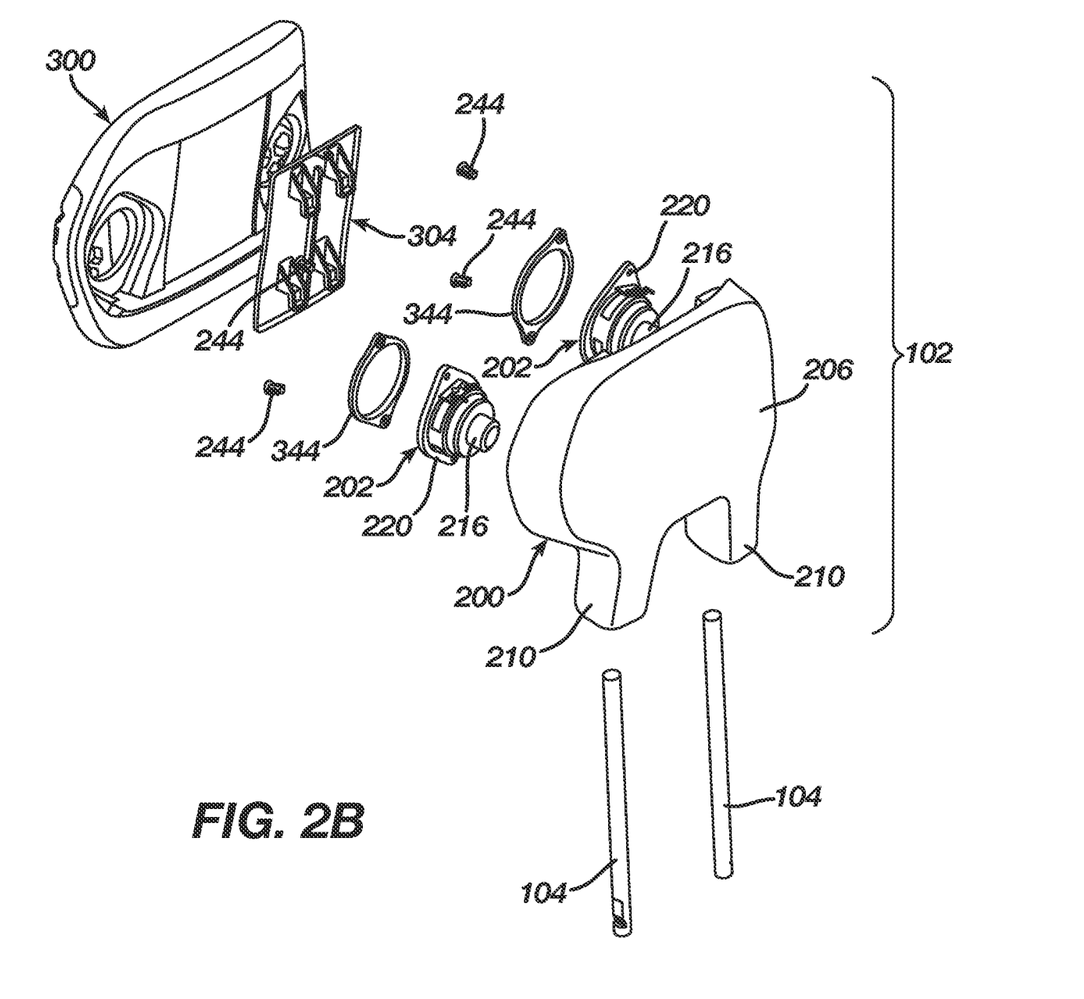
FIG. 2B is an exploded rear perspective view of the vehicle headrest of FIG. 1A.
Figure 4:
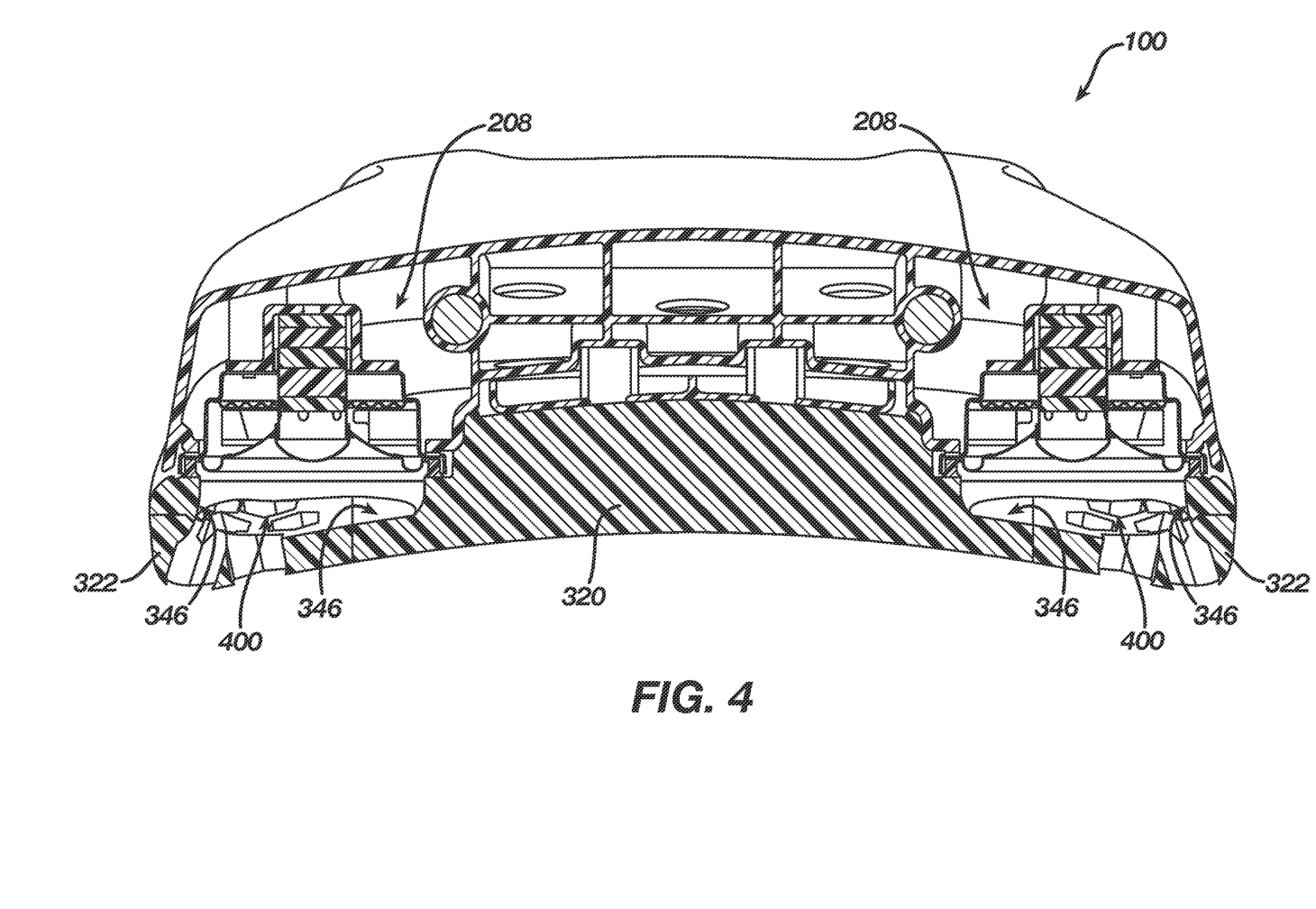
FIG. 4 is cross-sectional view of the vehicle headrest of FIG. 1A.

With reference to FIGS. 2A & 2B, the main body portion 102 includes a core assembly 200 which supports a plurality of electro-acoustic transducers 202. The core assembly 200 includes a baffle member 204 and a back cover 206 that is coupled to the baffle member 204 to define an acoustic enclosure with one or more acoustic chambers 208 (see also FIG. 4) therebetween. The baffle member 204 and back cover 206 can be formed from plastic, such as acrylonitrile butadiene styrene (ABS), polycarbonate (PC), or a polyphenylene ether (PPE)+polystyrene (PS) blend, in an injection molding process. In other examples the baffle member 204 and back cover 206 may be formed from other suitable materials. The baffle member 204 and the back cover 206 may be coupled together with mechanical fasteners (e.g., screws), adhesive, welding (e.g., ultrasonic welding, or combinations thereof.

The back cover 206 defines a rear surface 110 (FIG. 1B) of the headrest 100. The back cover 206 may also define sockets 210 for receiving a distal end portion of one of the support rods 104. The distal end portions of the support rods 104 are pushed up into the sockets 210. The connection between the sockets 210 and the support rods 104 can be a friction fit. Alternatively or additionally, the sockets 210 and the support rods 104 can include interlocking features that help to secure the rods 104 within the sockets 210. The sockets 210 are configured to provide sufficient structural overlap with the support rods 104 such that impact forces that hit the headrest are transmitted into the bars. Furthermore, while an implementation has been described in which the sockets 210 are defined by the back cover 206, in some cases, the sockets 210 may be formed separately from the back cover 206 and subsequently secured thereto (e.g., via adhesive or hardware). For example, in some implementations, the sockets 210 may be defined by the baffle member 204. In some implementations, the baffle member 204 may have a multi-piece construction.

The baffle member 204 defines a pair of holes 212 for accommodating the electro-acoustic transducers 202. Each of the electro-acoustic transducers 202 includes a diaphragm 214, a drive unit 216 (e.g., a voice coil motor) arranged along a rear radiating surface of the diaphragm 214, a dust cap 218 arranged centrally along a front radiating surface of the diaphragm 214, and a frame 220 for supporting the drive unit 216 and the diaphragm 214. The frames 220 mount straight to the baffle member 204, e.g., with screws, such that the rear radiating surfaces of the diaphragms 214 radiate acoustic energy into the one or more acoustic chambers 208. In some cases, the one or more acoustic chambers 208 may include a separate acoustic chamber for each electro-acoustic transducer, such that the electro-acoustic transducers radiate acoustic energy into separate, respective acoustic chambers that are acoustically isolated from each other.

In the illustrated implementation, the electro-acoustic transducers 202 are mounted such that they are forward firing; i.e., the motion axes of the electro-acoustic transducers are substantially normal to the front surface of the headrest, against which the user's head rests, and are substantially parallel to each other. In the forward firing configuration, the front radiating surfaces of the electro-acoustic transducers 202 are arranged to radiate acoustic energy in a direction that is substantially normal to the front surface of the headrest 100. Still, in other implementations, the electro-acoustic transducers may be arranged to radiate at an angle, e.g., up to 40 degrees.

In some cases, wiring may be routed into the acoustic chambers 208 through one or more of the support rods 104. Alternatively, wiring might also be routed through a third, center post (not shown) rather than inside the support rods. In some cases, one or more slots may be formed in the acoustic enclosure in order to pass electrical wiring into the acoustic chambers 208 for driving the electro-acoustic transducers 202. Such slots can be sealed during assembly.

Figure 3A:
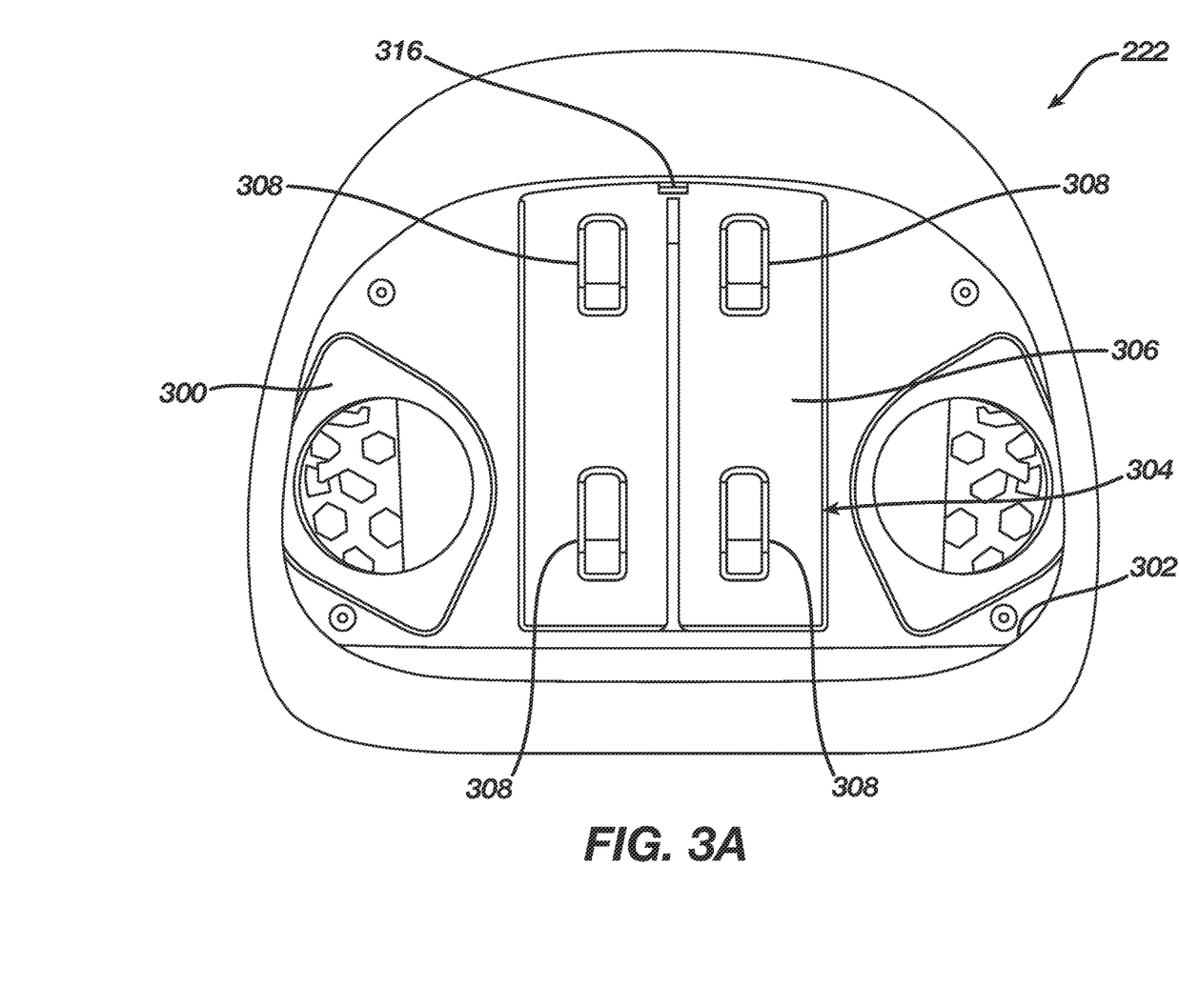
FIG. 3A is a rear view of a cushion member from the vehicle headrest of FIG. 1A.

The main body portion 102 also includes a cushion member 222 (FIG. 3A). Referring to FIG. 3A, the cushion member 222 includes a foam member 300, a cover layer 302, and a mounting member 304.

It may be desirable to utilize a cushion material that provides high energy absorption for cushioning. For example, the foam member 300 can be formed of a material having an energy absorption that meets automotive head restraint safety requirements; in one case, safety requirements dictate that for a spherical mass of 6.8 kg traveling at 24.1 km/h, the deceleration must not exceed 80 g's continuously for more than 3 milliseconds. (See Federal Motor Vehicle Safety Standard No. 202, Head Restraints (FMVSS No. 202, at S4.2.5 and S5.2.5)). It may also be desirable to utilize a cushion material (e.g., a foam material) that provides for high acoustic damping to help acoustically isolate the electro-acoustic transducers 202. The cover layer 302 can, for example, be a type of fabric capable of being drawn around the foam member 300. The cover layer 302 material is an acoustically transparent, cosmetic material, and, in some cases, it may cover and obscure or hide the underlying grilles.

The mounting member 304 includes a mounting plate 306 and a plurality of hooks 308 that extend outwardly from a rear surface 310 of the mounting plate 306. A front surface of the mounting plate 306 is secured to a rear surface of the foam member 300, e.g., with fasteners and/or adhesive. Alternatively or additionally, in some implementations, the foam member 300 may be bonded to the mounting member in an overmolding process, i.e., the foam member 300 may be molded directly on the mounting member. The cushion member 222 is then secured to the core assembly 200 by hooking the hooks 308 into corresponding recesses 314 (FIG. 2A) formed in the baffle member 204. With the hooks 308 hooked into the recesses 314, a tab 316 on the mounting member 304 overlies a mounting hole 226 (FIG. 2A) in the baffle member 204. A fastener can then be passed through an opening 318 (FIG. 3C) in the tab 316 and into the mounting 226 to secure the tab 316 to the baffle member 204. The mounting member 304 can be formed of a rigid material, such as a rigid polymer or metal and may be formed in a molding and/or machining process. Still, other mechanical fastening methods for attaching the cushion member to the core assembly are contemplated.

The foam member 300 is a unitary foam part that has regions of contrasting firmness. In that regard, indentation force deflection (IFD) is a measurement of foam firmness. IFD is measured by indenting (compressing) a foam sample 25% of its original height. The amount of force (e.g., in pounds) required to indent the foam is its 25% IFD measurement. The more force required the firmer the foam. Flexible foam IFD measurements range from about 5 pounds (supersoft) to about 80 pounds (very firm).

Figure 3B:
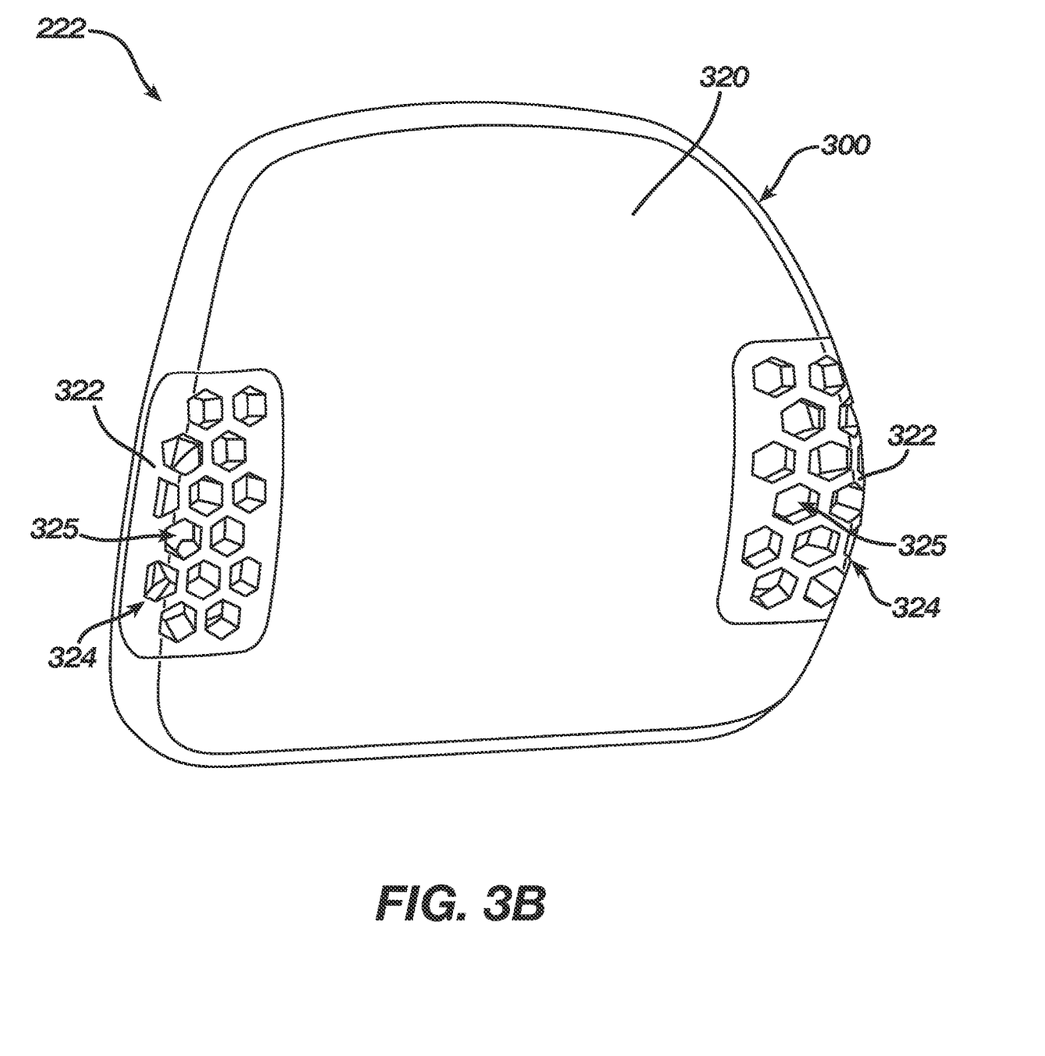
FIG. 3B is a front perspective view of the cushion member of FIG. 3A.
Figure 3C:
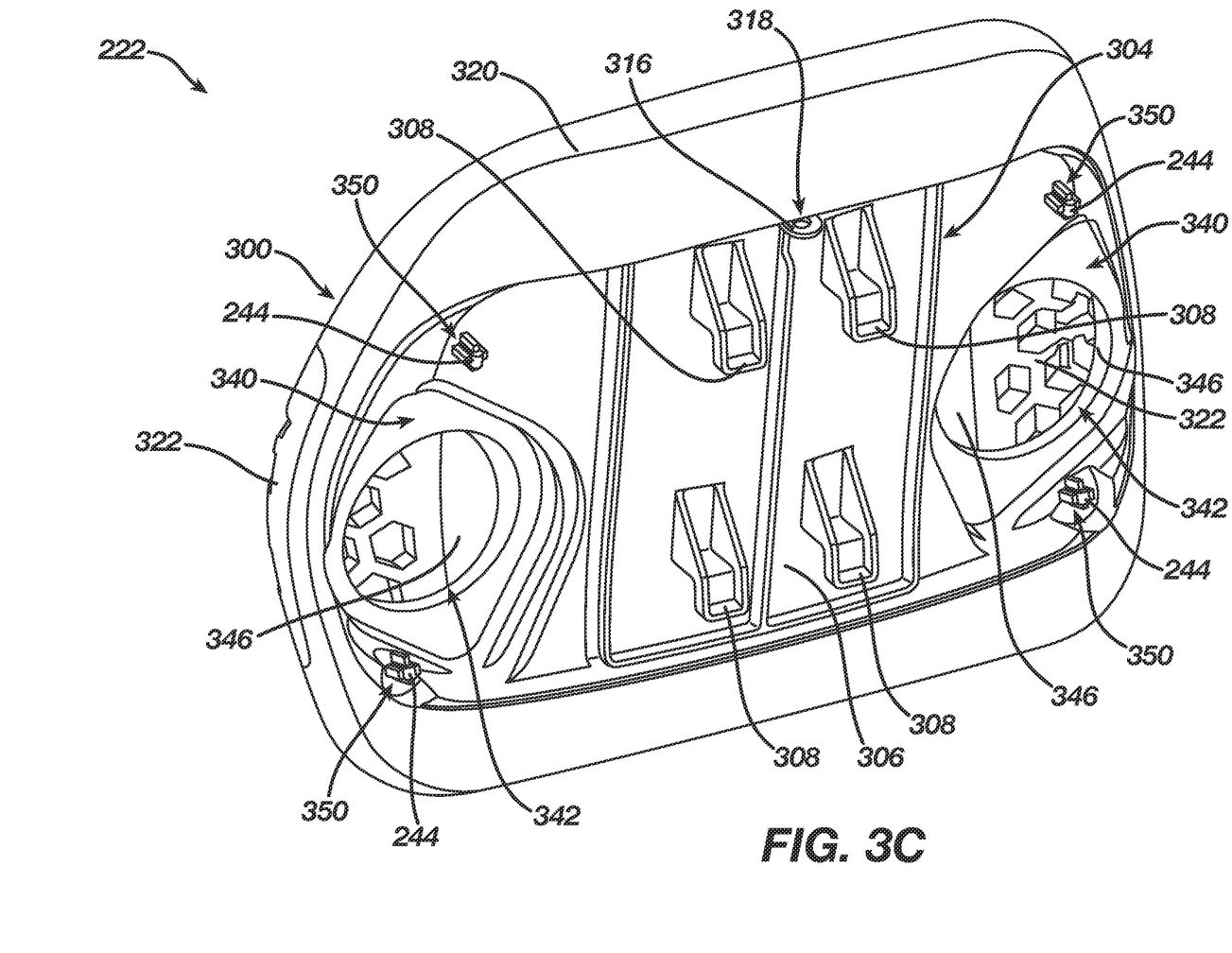
FIG. 3C is a rear perspective view of the cushion member of FIG. 3A.

Referring to FIGS. 3B & 3C, the foam member 300 has a first region 320 that has a first firmness and a plurality of second regions 322 each having a second firmness that is greater than the first firmness. The foam member 300 is unitary in that the second regions 322 are integral with the first region 320. Each of the second regions 322 defines a speaker grille 324 that is configured to overlie a corresponding one of the electro-acoustic transducers 202. The foam member 300 has a thickness of 10 mm to 50 mm in the second (grille) regions 322. The grille 324 is formed by an array of apertures 325 defined in the second region 322, which allows acoustic energy radiated from the electro-acoustic transducers 202 to pass therethrough. Each of the apertures 323 can have an open area of 100 mm^2 to 184 mm^2, and each grille 324 may have a total open area of 2200 mm^2 to 2400 mm^2, e.g., about 2300 mm^2. Preferably, each of the speaker grilles 324 has an open area of at least about 50% of the area of the diaphragm 214. The aperture design may change depending on design, material and manufacturing process. The harder region is less prone to absorbing acoustic energy and is less likely to be displaced via acoustic energy. The harder region also helps to provide a more uniform support for the cover layer material in the area of the grille pattern, which can also be a source of lost acoustic energy when it is poorly (loosely) supported.

It can be desirable to provide the first region 320 with a relatively soft foam for comfort, as this part is likely to contact a user's head. However, it has been found that the use of such a soft foam in the grille regions 322 can result in a loss of acoustic energy radiated from the electro-acoustic transducers. To minimize loss of acoustic energy the grille regions 322 are made harder. In some cases, the first region 320 and the second regions 322 each have a hardness of Shore A 50 or less.

One manner of providing harder grille regions 322, while maintaining a unitary construction, is by controlling the foam density such that the different regions have contrasting foam density. The first region 320 has a first foam density and the second (grille) regions 322 have second foam density that is greater than the first foam density. Preferably, the second regions 322 have a foam density that is at least twice (2×) that of the first region 320. In one example, the foam member 300 is formed of flexible polyurethane foam. The first region 320 is formed with a foam density in pounds per cubic foot (PCF) of 2 PCF to 8 PCF, e.g., 7 PCF, and the second regions 322 are formed, concurrently, with a foam density of at least 8 PCF, e.g., 14 PCF to 30 PCF. These values are based on the use of soft (flexible) foam, if a more rigid foam is utilized for the second regions the foam density may be lower due to the higher hardness. The foam member 300 could be formed in a multi-step molding process (such as an in-mold, two-shot foam molding process or an insert mold process), in which either the first region 320 or the second regions 322 is/are formed first in an initial molding step and then the other region(s), i.e., the other of the first region 320 and the second regions 322, is molded around the pre-formed part(s). Alternatively or additionally, the second regions may be formed of an expanded resin, such as expanded polypropylene (EPP) or expanded polystyrene (EPS).

Polyurethane foam is produced from a reaction of two key chemicals, a polyol and an isocyanate with water. These are mixed together in specific amounts. The properties of the foam, including density and firmness, can be controlled by adjusting the proportions of these ingredients. Foam molding (such as the two-shot and/or insert molding referenced above) is a process where individual items are produced by pouring chemicals into specifically shaped molds and allowing the foam reaction to take place. The molding process also helps to form a skin on the outer surfaces of the foam member 300. The skin is result of the contact between the mold surface and the foam. The skin can be beneficial because it can provide a good acoustic barrier that inhibits absorption of acoustic energy by the foam member 300. The use of the higher foam density in the grille regions results in less loss of acoustic energy. The first region 320 retains its softness, by virtue of the lower foam density, for added comfort in the areas most likely to contact the user's head. And, importantly, the part remains unitary which allows for simplified assembly as well as a seamless (gapless) transition between the regions of the contrasting harness for a smooth contour.

An alternative, or additional, method for achieving a greater firmness in the second regions 322 is by introducing additives into the polyol, isocyanate, and water mixture. Such additives can include: catalysts, surfactants, flame retardants, and fillers.

Referring to FIG. 3C, the foam member 300 defines a pair of recesses 340 which are formed in respective portions of the first region 320 that underlie the second regions 322. Each of the recesses 340 conforms to a shape of the frame 320 (FIG. 2A). The foam member 300 also defines openings 342 within the recess 340, each of which provides a clear path from a corresponding one of the electro-acoustic transducers 202 to a respective one of the grilles 324. In some implementations, each of the recesses 340 has a depth that accommodates a pad ring 344 (FIGS. 2A & 2B) between the electro-acoustic transducer 202 and the foam member 300, and such that the foam member 300 engages the pad ring 344 so as to form an acoustic seal therebetween. The pad ring 344 can be formed of paper or plastic and is typically used to provide a broad flat surface against which a seal can be made, or, in some cases, the pad rings are used to assist in maintaining stiffness of the diaphragm during assembly of the electro-acoustic transducer. Alternatively or additionally, the foam member 300 can be configured to engage the frames 220 directly, e.g., in the absence of a pad ring, so as to form an acoustic seal therebetween.

The foam member 300 further defines walls 346 within the openings 342, which form acoustic channels 400 (FIG. 4) that lie adjacent the front radiating surfaces of the electro-acoustic transducers 202. The acoustic channels 400 help to divert acoustic energy radiated from the electro-acoustic transducers 202 toward respective, desired directions.

In the illustrated example, the foam member 300 also defines a pair of pockets 350 (FIG. 3C) for receiving Christmas tree fasteners (a/k/a push-in rivets, item 244, FIGS. 2A & 2B). The pockets 350 may be configured to receive and retain respective heads of the fasteners. The opposite ends of the fasteners 244 are pushed into apertures 245 (FIG. 2A) formed in the baffle member 204 to assist in securing the cushion member 222 to the core assembly. The Christmas tree fasteners 244 help to ensure that a good acoustic seal is provided between the foam member 300 and the baffle member 204, and may help to ensure that the grille foam member 300 conforms to the desired contour of the headrest 100. Alternatively or additionally, magnets could be seated within the pockets and may be arranged to couple to mating magnets mounted in the baffle member 204. The use of magnets may, for example, open the possibility for user customization, different foam members could be chosen and reassembled. Still other means of connecting the foam member to the baffle member.

A number of implementations have been described. Nevertheless, it will be understood that additional modifications may be made without departing from the scope of the inventive concepts described herein, and, accordingly, other implementations are within the scope of the following claims.

What is claimed is:

1. A vehicle headrest comprising:
an electro-acoustic transducer;
an acoustic enclosure supporting the electro-acoustic transducer; and
a unitary foam member coupled to the acoustic enclosure, the foam member having regions of contrasting firmness including a first region having a first firmness and a second region having a second firmness that is greater than the first firmness, the second region being coupled with the first region in a seamless transition having a smooth contour, wherein the second region defines an array of apertures formed in the second region of the foam member that further defines a speaker grille that is configured to overlie the electro-acoustic transducer, and whereby the greater firmness of the second region is configured to provide uniform support for a cover layer material over the array of apertures.

2. The vehicle headrest of claim 1, wherein the foam member has a first foam density, and the second region has a second foam density that is greater than the first foam density.

3. The vehicle headrest of claim 2, wherein the second foam density is at least twice (2×) the first foam density foam density.

4. The vehicle headrest of claim 3, wherein the first region has a foam density of about 2 PCF to about 8PCF, and wherein the second region has a foam density of at least about 12 PCF.

5. The vehicle headrest of claim 1, wherein the first and second regions each have a hardness less than or equal to Shore A 50.

6. The vehicle headrest of claim 1, wherein the foam member is formed of a closed cell foam.

7. The vehicle headrest of claim 1, wherein the foam member is formed of polyurethane.

8. The vehicle headrest of claim 1, wherein the second region overlies a portion of the first region, such that the portion of the first region is disposed between the second region and the electro-acoustic transducer.

9. The vehicle headrest of claim 1, wherein the electro-acoustic transducer comprises a frame for mounting the electro-acoustic transducer to the acoustic enclosure; and
wherein the foam member defines a recess that is formed in a portion of the first region that underlies the second region, wherein the recess conforms to a shape of the frame, and wherein the foam member further defines an opening within the recess that provides a clear path from the electro-acoustic transducer to the grille.

10. The vehicle headrest of claim 9, wherein the foam member is configured to engage the frame so as to form an acoustic seal therebetween.

11. The vehicle headrest of claim 9, further comprising a pad ring coupled to the frame, wherein the recess has a depth that accommodates the pad ring between the frame and the foam member, and wherein the foam member engages the pad ring so as to form an acoustic seal therebetween.

12. The vehicle headrest of claim 1, wherein the first region further defines at least a portion of an acoustic channel that helps to divert acoustic energy radiated from the electro-acoustic transducer toward a desired direction.

13. The vehicle headrest of claim 1, wherein the first and second regions are formed concurrently in a two-shot molding process.

14. The vehicle headrest of claim 1, wherein one of the first region and the second region is formed around the other of the first region and the second region in an insert molding process.

15. The vehicle headrest of claim 1, wherein the grille has a thickness of 5 mm to 10 mm.

* * * * *